United States Patent
Demus et al.

(10) Patent No.: US 6,329,026 B1
(45) Date of Patent: Dec. 11, 2001

(54) COMPOSITIONS CONTAINING CHIRAL COMPOUNDS AND NEMATIC LIQUID CRYSTALS, AND DEVICES USING THEM

(75) Inventors: Dietrich Demus, Halle (DE); Ryokichi Tarao, Chiba (JP); Hiroyuki Takeuchi; Kazutoshi Miyazawa, both of Ichihara (JP)

(73) Assignee: Chisso Corporation, Osaka (JP)

( * ) Notice: Subject to any disclaimer, the term of this patent is extended or adjusted under 35 U.S.C. 154(b) by 0 days.

(21) Appl. No.: 09/155,852
(22) PCT Filed: Apr. 11, 1996
(86) PCT No.: PCT/JP96/01001
  § 371 Date: Oct. 5, 1998
  § 102(e) Date: Oct. 5, 1998
(87) PCT Pub. No.: WO97/38346
  PCT Pub. Date: Oct. 16, 1997
(51) Int. Cl.[7] .............................. C09K 19/02; G02F 1/13; G11B 5/02
(52) U.S. Cl. .................. 428/1.1; 252/299.01; 349/2; 349/128; 349/191; 349/196; 430/270.11
(58) Field of Search ................ 252/299.01, 299.5; 349/191, 196, 2, 128; 428/1.1; 430/270.11

(56) References Cited

U.S. PATENT DOCUMENTS 4,630,898 * 12/1986 Jewell .................................. 359/243
4,761,246   8/1988 Takashi et al. .................. 252/299.68

FOREIGN PATENT DOCUMENTS 134279   2/1979 (DE).
242624   2/1987 (DE).
2-280116 11/1990 (JP).

OTHER PUBLICATIONS

"Materials for Optical Data Storage", M. Emmelius, et al., Angewandte Chemie, vol. 28, No. 11, pp. 1445–1471, 1989.
"Liquid Crystals Applications and Uses", H. Finkelmann, et al., World Scientific Singapore 1992, vol. 3, 345–370.
"Liquid Crystals Applications and Uses", S. Kobayashi, et al., World Scientific Singapore 1992, vol. 3, 291–293.
"Liquid Crystals Applications and Uses", D. Coates, World Scientific Singapore 1990, vol. 1, 275–303.
"Photoracemization of Optically Active 1,1'–Binaphthyl Derivatives: Light–Initiated Conversion of Cholesteric to Compensated Nematic Liquid Crystals" M. Zhang, et al, J. Phys. Chem., 1992, vol. 96, pp. 3063–3067.
"Polarization holography. 1: A new high–efficiency organic material with reversible photoinduced birefringence" T. Todorov, et al., Applied Optics, 1984, vol. 23, No. 23, pp. 4309–4312.
"Reversible digital and holographic optical storage in polymeric liquid crystals", M. Eich, et al., Makromol. Chem., Rapid Commun., 1987, vol. 8, pp. 59–63.
"Erasable holograms in polymeric liquid crystals", M. Eich, et al., Makramol. Chem., Rapid Commun., 1987, vol. 8, pp. 467–471.
"Chiroptical Molecular Switch", B.L. Feringa, et al., J. Am. Chem. Soc., 1991, vol. 113, pp. 5468–5470.

(List continued on next page.)

Primary Examiner—Shean C. Wu
(74) Attorney, Agent, or Firm—McDermott, Will & Emery

(57) ABSTRACT

Devices useful for storage of information which comprises mixtures of suitable chiral materials with nematic liquid crystals and in which by irradiation with light of two different wavelengths the chirality of the mixture can be reversibly switched between two stable states of different chirality, corresponding to two states of different optical properties.

10 Claims, 2 Drawing Sheets

1. Glass or plastic plate
2. Homeotropic alignment film
3. Homogeneous alignment film
   ( the direction of alignment parallel to the paper)
4. Polarizer
5. Cholesteric liquid crystals layer

OTHER PUBLICATIONS

"Chiroptical Molecular Switches 2; Resolution, Properties and Applications of Inherent Dissymmetric Alkenes", W.F. Jagar, et al., Mol. Cryst. Liq. Cryst. 1992, vol. 217, pp. 133–138.

"Chirality in nonlinear optics and optical switching", E.W. Meijer, et al., Mol. Cryst. Liq. Cryst., 1993, vol. 235, pp. 169–180.

"A Highly Stereoselective Optical Switching Process Based on Donor–Acceptor Substituted Dissymmetric Alkenes", W.F. Jagar, et al., Agnew. Chem. Int. Ed. Engl., 1995, vol. 34, No. 3, pp. 348–350.

New disc–shaped mesogens based on pentakis(phenylethynyl)benzene derivatives, D. Janietz, et al., Liq. Cryst., 1993, vol. 13, No. 2, pp. 247–253.

Journal of the American Chemical Society, B.L. Feringa, et al., 1995, vol. 117, No. 39, pp. 9929–9930.

"Pitch and sense of helix in mixtures of optically active azo or azoxy compounds and nematic liquid crystal", M. Tsukamoto, et al., Chemical Abstracts, Nov. 24, 1975, vol. 83, No. 21, Abstract No. 178127y, p. 495, col. 2.

* cited by examiner

1. Glass or plastic plate
2. Homeotropic alignment film
3. Homogeneous alignment film
   ( the direction of alignment parallel to the paper)
4. Polarizer
5. Cholesteric liquid crystals layer

COMPOSITIONS CONTAINING CHIRAL COMPOUNDS AND NEMATIC LIQUID CRYSTALS, AND DEVICES USING THEM

This application is a 371 of PCT/JP96/01001, filed Apr. 11, 1996.

TECHNICAL FIELD

This invention relates to novel chirooptical systems and displays using novel chirooptical medias. Specifically this invention relates to liquid crystal optical storage devices and systems.

BACKGROUND ART

For storage of data, materials and devices with reversible optical storage capability are needed. Optical storage can be applied in optical computers, storage systems for audio and video informations.

There are many types of optical storage devices, which can be written in only once (write-once-read-many systems= WORM systems), using irreversible processes for storage. However they were not applicable for storage systems for computers and, find only limited application in audio and video informations because of their non-reversible properties.

For many purposes more advantageous are devices, which can be written in multifold (erasable-direct-read-after-write systems=EDRAW systems) by use of reversible storage processes. For this purpose a survey about materials for optical data storage has been presented by M. Emmelius, G. Pawlowsky and H. W. Vollmann, Angew. Chem. Intern. Ed. 28, 1445 (1989). However because all available media for optical data storage have some shortcomings like storage density, storage rate, reversibility, long time stability, the search for new optical storage materials and devices is quite actual.

Devices of this kind typically consist of a layer of liquid crystal material, contained between two glass slides. By irradiation with light of different wavelengths, devices containing azo compounds change from the nematic to the isotropic state and reverse (for example, D. Demus, G. Pelzl, F. Kuschel DD WP 134 279).

Especially liquid crystalline polymers containing azo groups have been proposed for such devices (H. Finkelmann, W. Meier and H. Scheuermann, in: Liquid Crystals. Applications and Uses, ed. by B. Bahadur, World Scientific Singapore 1992, vol. 3, p. 345–370).

The proposed azo compounds have the disadvantage, that the intensity and time of irradiation are quite high, because a large amount of the azo compound has to be transformed to the corresponding isomer. Therefore the switching times are extremely large.

Also thermo-optical liquid crystal devices have been proposed, based on thermally induced texture change of cholesteric phases (S. Kobayashi and A. Mochizuki, in: Liquid Crystals. Applications and Uses, ed. by B. Bahadur, World Scientific, Singapore 1992, vol. 3, p. 291–293) or smectic A phases (D. Coates, in: Liquid Crystals. Applications and Uses, ed. by B. Bahadur, World Scientific, Singapore 1990, vol. 1, p. 275–303).

Thermo-electrooptic displays use the combined effect of heat and electric fields, in glass forming low-molecular glass forming liquid crystals (D. Demus and G. Pelzl, DD WP 242 624 A1) resp. polymer glass forming liquid crystals (H. Finkelmann, W. Meier and H. Scheuermann, in: Liquid Crystals. Applications and Uses, ed. by B. Bahadur, World Scientific, Singapore 1992, vol. 3, p. 345–370). However thermo-optical devices generally need a quite large energy for locally heating up the liquid crystal material.

M. Zhang and G. B. Schuster, J. Phys. Chem. 96, 3063–3067 (1992) reported about the photoracemization of chiral binaphthyl derivatives, converting the cholesteric mixture to nematic mixture. Because the reaction is irreversible, the change from nematic to cholesteric is impossible and the material cannot be used for repeated data storage.

Holographic technology has been investigated for reversible data storage systems. Several kind of materials have been investigated toward this application. There are three types of materials, inorganic metal compounds, photorefractive polymers and polymer liquid crystals, have been reported. However they all have disadvantages.

For materials of optical data storage, photorefractive crystals like lithium niobate ($LiNbO_3$), barium titanate ($BaTiO_3$) and bismuth silicon oxide ($Bi_{12}SiO_{20}$), have been proposed and studied for 25 years. However because they are difficult and expensive to grow, and their properties cannot easily be modified, they have not become commercially feasible.

Variety of photorefractive polymer and polymer liquid crystals have also been proposed (K. Yoshinaga et al., Japanese Patent Kokai 2-280116, T. Todorov et al., Applied Optics, 23 (23), 4309 (1984), M. Eich et al., Makromol. Chem., Rapid Commun., 8, 59 and 467 (1987)). It was recognized that the photorefractive effect enable them to store 100 or more complete image or holograms, each containing 1 million bits of imformations. They can be easily produced so that they have a big economic advantage. They, however, have significant disadvantages. The speed with which they respond to light is quite slow compared with semiconductors. And most of the existing polymers require that an electric field be applied to orient the non-liner optical chromophores so that the material becomes electro optically active.

Novel data storage systems, devices and materials which are easy to produce, and have advanced properties, such as low viscosity facilitating quick response, large capacity of data storage, reversible and stable with reading and writing informations, have been desired. The aim of this invention is to overcome the above mentioned disadvantages of the previous technologies and providing novel data storage systems, devices and materials having above mentioned desired properties.

DISCLOSURE OF INVENTION

By our continuous efforts, it has been found, that using mixtures of suitable chiral materials (chiral dopants) with nematic liquid crystals, by irradiation with light of two different wavelengths the chirality of the mixture can be reversibly switched between two stable states of different chirality, corresponding to two states of different optical properties, useful for storage of information.

By using two states having different optical properties that are induced by the different chiral pitch lengths, large number of informations can be stored in the liquid crystal mixtures. The system is reversible and by irradiation with light having two different wavelengths reading and writing data can be repeated. The two states are chemically and phsically stable and except the switchings the optical properties of the two states never change.

The system, specifically devices, consist of nematic liquid crystal cells comprising chiral nematic liquid crystals inbetween two glass or plastic plates. The information storage can be done within nematic temperature ranges.

Because the invented data storage system uses nematic liquid crystals as the data storage materials, the viscosity of the materials is relatively low, which facilitate very quick response against light irradiation.

These attractive properties can be induced by the combination of nematic liquid crystals, chiral dopants, nematic liquid crystal cells and light irradiation, which is novel strategy that has never been proposed before.

More specific description is as follows. For example, for materials showing irradiation induced switching between two states of different chirality, the form "A" can be switched to another form "B" by irradiation with light of wavelength "C" nm, the reverse switching occurs with light of another wavelength "D" nm. The switching between the two forms does not need to be completed. The two states consist of mixtures of both isomers, however, differing in their chirality.

The chiral compounds and mixtures of both are dissolved in liquid crystal materials, usually multicomponent mixtures, giving cholesteric liquid crystalline media (chiral nematic mixture).

The cholesteric medium exhibits strong optical activity, this is turning of the plane of linearly polarized light. This material is preferably inserted between two substrate planes, e.g., glass or plastic plates, forming a hybrid cell. In the hybrid cell the two substrate planes are arranged in such a manner that the liquid crystal molecules on one plane are parallel, with or without a tilt angle, on the other plane perpendicular to the substrate planes as shown in FIG. 1. Filled with the cholesteric material, the hybrid cell shows optical activity. Two polarizers, whose polarizing axes are perpendicular with each other, are placed outside of two substrate planes.

The optical activity depends on the concentration of the chiral dopants and the cell thickness. Increasing concentration of dopant and increasing cell thickness increase the optical activity. By adjusting the polarizers in a suitable direction the device shows the dark state. After irradiation with light of wavelength "C" nm, the device shows the bright state. Irradiating the bright state with light of wavelength "D" nm let the device return to the dark state.

Both dark and bright states are stable for a long period, so that the device can be used for information storage. The irradiation can be done point-wise or in a scanning mode, using a suited laser. Irradiation with the projection of a picture allows to store the whole picture.

The polarizers can be adjusted also in another manner, that at first the device is in the bright state, and after irradiation with light of wavelength "D" nm switches to the dark state.

The devices of the invention can be used also for holographic recording of informations. In this case a laser is preferably used for writing informations. According to FIG. 2, the laser beam is split into two beams, one of which is modulated by the modulator. Within the liquid crystal device, that is described in this invention, the two beams interfere to give the hologram containing the informations. Using laser light in the visible spectrum, preferably circularly polarized laser light, the information can be read. By irradiation with light of another different wavelength, the information can be erased.

In principle any kind of light, both visible and invisible light, polarized and non polarized light, can be used for the irradiation for the switching.

The nematic liquid crystals used for this invention can be provided by doping chiral compounds into ordinary achiral nematic liquid crystal base mixtures. All sort of chiral compounds that induce helical twist structures and induce two stable states having two different optical properties when irradiated by two kind of light having different wavelengths, when combined with nematic liquid crystal base mixtures, can be used for this invention. In this case the chiral compounds used for doping do not need to have liquid crystalline property.

For example, chiral compounds suited for the device are sterically overcrowded chiral olefins (B. L. Feringa, W. F. Jager, B. de Lange J. Am. Chem. Soc. 113, 5468–5470 (1991); W. F. Jager, B. de Lange, B. L. Feringa Mol. Cryst. Liq. Cryst. 217, 133–138 (1992); E. W. Meijer, B. L. Feringa Mol. Cryst. Liq. Cryst. 235, 169–180 (1993), W. F. Jager, J. C. de Jong, B.de Lange, N. P. M. Huck, A. Meetsme and B. L. Feringa, Angew. Chem. Int. Ed. Engl., 34 (1995), No. 3, 348–350). They can be represented e.g. by the formula (1-1).

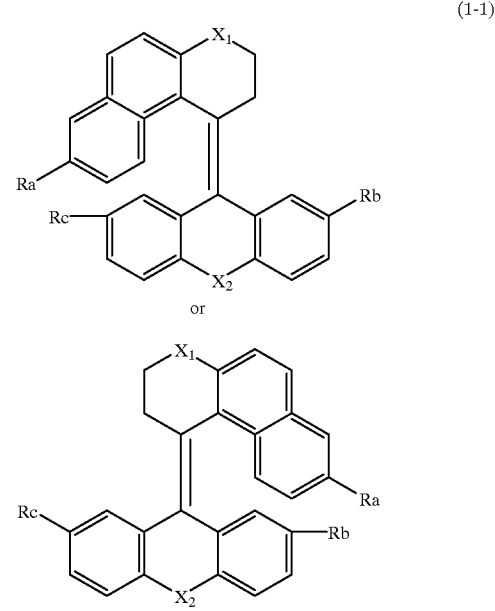

(wherein Ra, Rb, Rc=alkyl, alkoxy, hydrogen, hydroxyl, nitro, dialkylamino, and X1, X2=oxygene, sulfur, methylene).

Also azo compounds of the general formula (1-2) which can exist as cis or trans isomers, can be used in the device, when they are substituted with a chiral group. The cis and trans isomers are different in their optical activity, and are able to transform nematic liquid crystals to cholesteric materials.

(1-2)

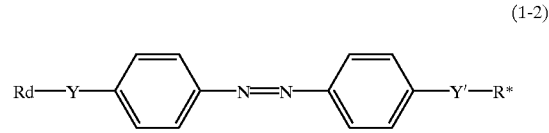

(wherein Y, Y'=independent upon another single bond, oxygene, sulfur, carbonyl, ester group, 1,2-ethylene, 1,2-ethenylene, 1,2-ethynylene, 1,4-butylene, methyleneoxy, oxymethylene, difluoromethyleneoxy, ring system like substituted or unsubstituted benzene, cyclohexane, heterocyclic ring, biphenyl, bicyclohexyl. Rd=alkyl, alkyloxy, alkanoyloxy, alkoxyalkyl, alkenyl, alkynyl, alkenyloxy, alkynyloxy, alkadienyl, alkadienyloxy, haloalkyl, haloalkyloxy. R*=chiral group, preferably extended group like 1-methylpropyl, 1-methylbutyl, 1-methylpentyl, 1-methylhexyl, 1-methylheptyl, 1-methyloctyl, 1-methylnonyl, 2-methylbutyl, 2-methylpentyl, 1-ethylheptyl, 1-trifluoromethylheptyl).

For the nematic liquid crystal basic mixtures, all structures of nematic compounds can be used. Ordinarily the following compounds (2-1)–(2-190) can be effectively used.

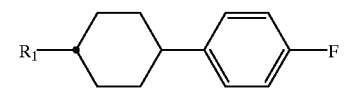 (2-1)

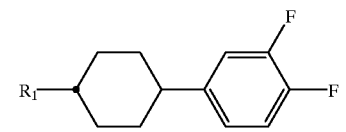 (2-2)

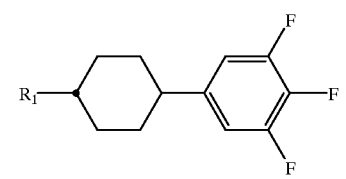 (2-1)

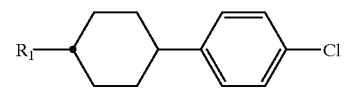 (2-2)

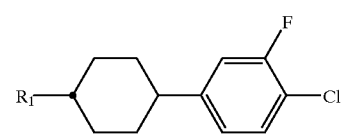 (2-3)

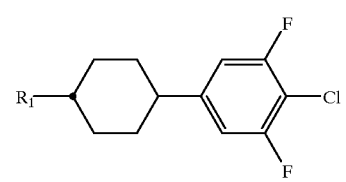 (2-4)

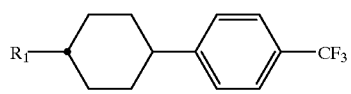 (2-5)

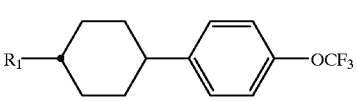 (2-6)

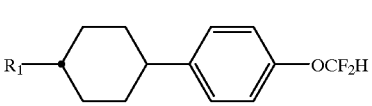 (2-7)

-continued

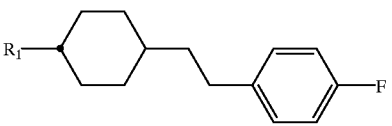 (2-8)

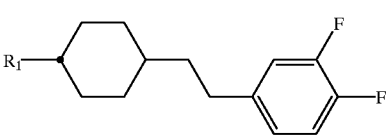 (2-9)

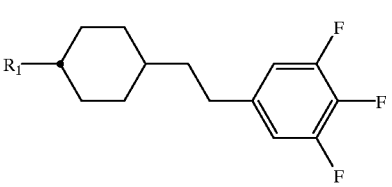 (2-10)

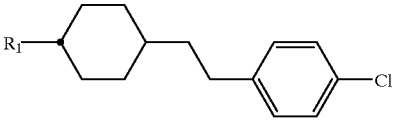 (2-11)

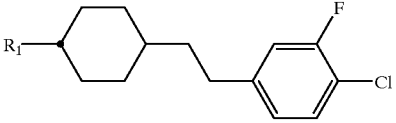 (2-12)

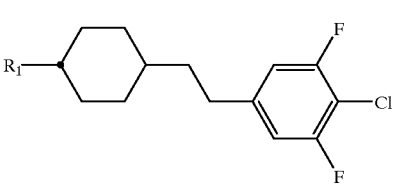 (2-13)

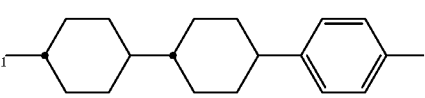 (2-14)

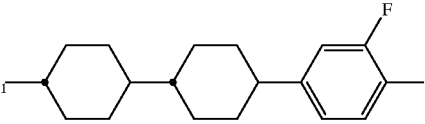 (2-15)

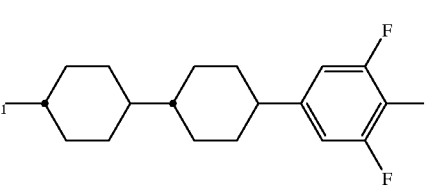 (2-16)

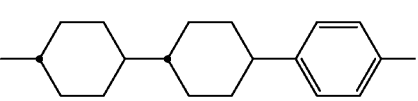 (2-17)

-continued (2-18) R₁–⬡–⬡–⌬(3-F, 4-Cl)

(2-19) R₁–⬡–⬡–⌬(3-F, 4-Cl, 5-F)

(2-20) R₁–⬡–⬡–⌬–CF₃

(2-21) R₁–⬡–⬡–⌬(3-F)–CF₃

(2-22) R₁–⬡–⬡–⌬(3-F, 5-F)–CF₃

(2-23) R₁–⬡–⬡–⌬–OCF₃

(2-24) R₁–⬡–⬡–⌬(3-F)–OCF₃

(2-25) R₁–⬡–⬡–⌬(3-F, 5-F)–OCF₃

(2-26) R₁–⬡–⬡–⌬–OCF₂H (2-27) R₁–⬡–⬡–⌬(3-F)–OCF₂H (2-28) R₁–⬡–⬡–⌬(3-F, 5-F)–OCF₂H (2-29) R₁–⬡–⬡–CH₂CH₂–⌬–F (2-30) R₁–⬡–⬡–CH₂CH₂–⌬(3-F, 4-F)

(2-31) R₁–⬡–⬡–CH₂CH₂–⌬(3-F, 4-F, 5-F)

(2-32) R₁–⬡–⬡–CH₂CH₂–⌬–Cl (2-33) R₁–⬡–⬡–CH₂CH₂–⌬(3-F, 4-Cl)

(2-34) R₁–⬡–⬡–CH₂CH₂–⌬(3-F, 4-Cl, 5-F)

(2-35) R₁–⬡–⬡–CH₂CH₂–⌬–CF₃

(2-36) R₁–⬡–⬡–CH₂CH₂–⌬(3-F)–CF₃

(2-37)
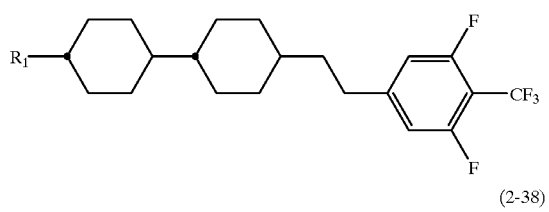
(2-38)
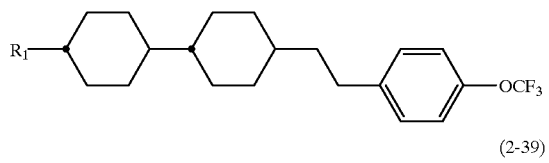
(2-39)
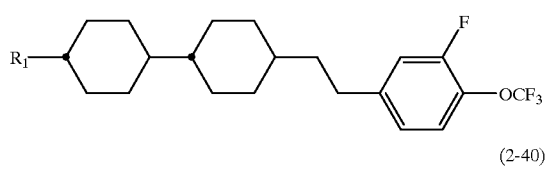
(2-40)
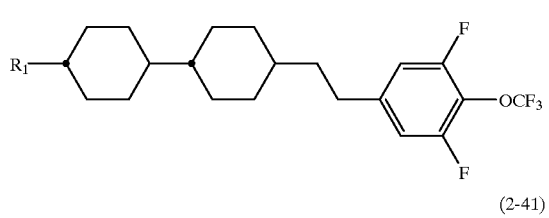
(2-41)
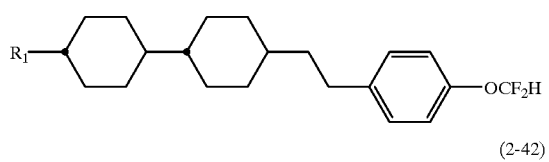
(2-42)
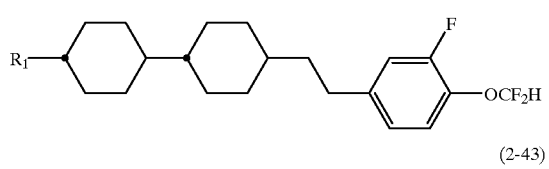
(2-43)
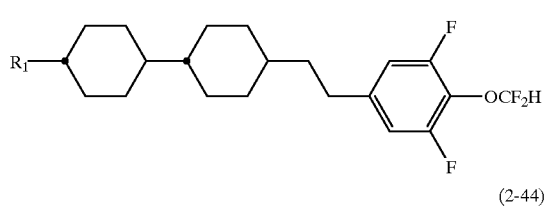
(2-44)
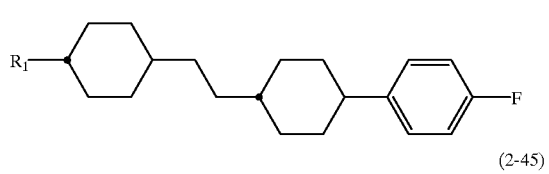
(2-45)
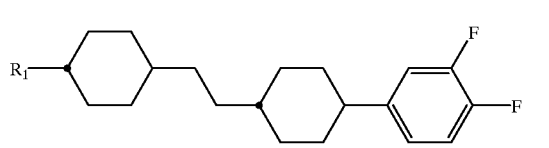
(2-46)
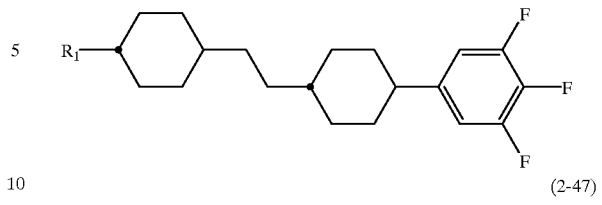
(2-47)
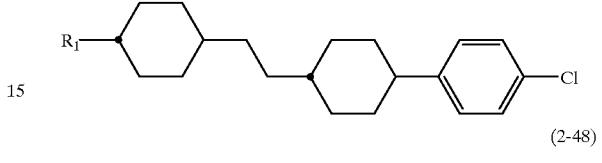
(2-48)
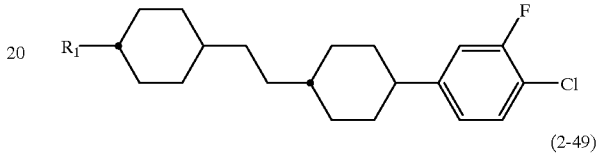
(2-49)
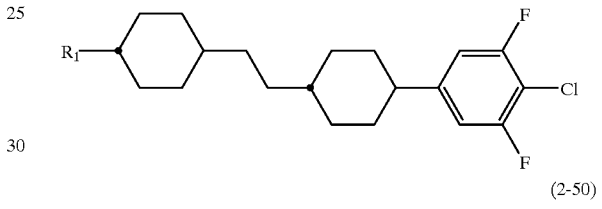
(2-50)
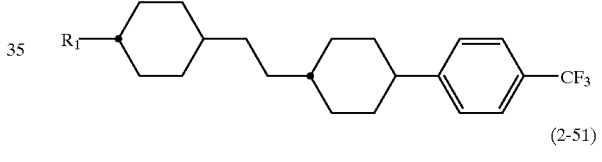
(2-51)
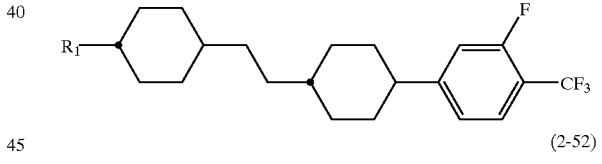
(2-52)
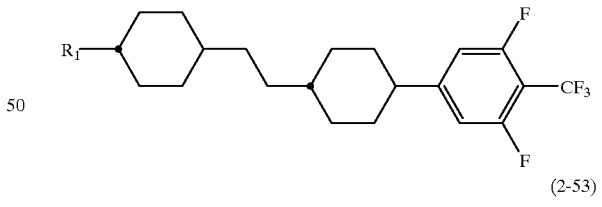
(2-53)
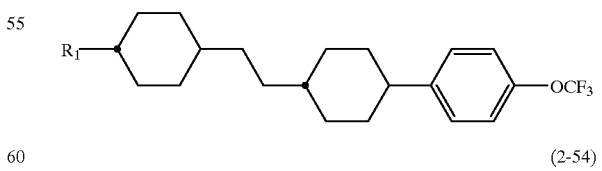
(2-54)
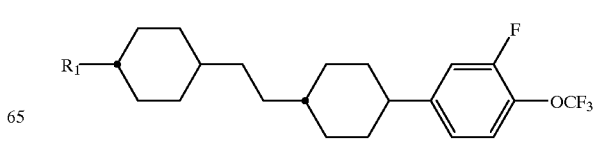

(2-55)
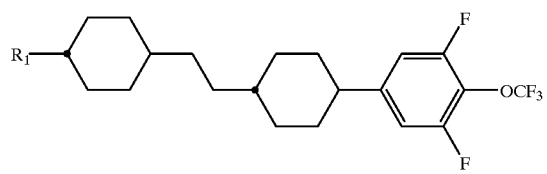
(2-56)
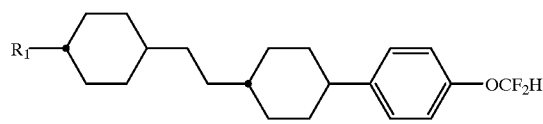
(2-57)
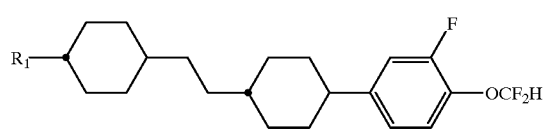
(2-58)
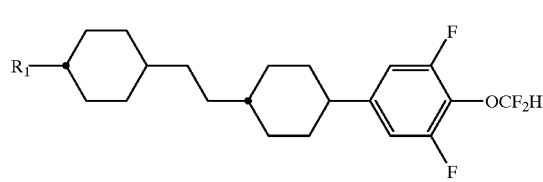
(2-59)
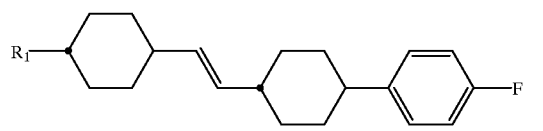
(2-60)
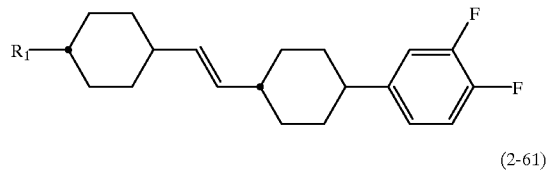
(2-61)
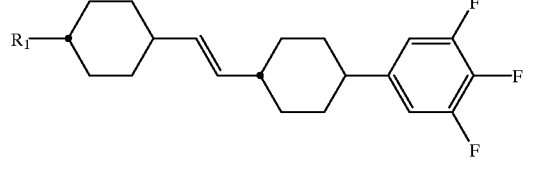
(2-62)
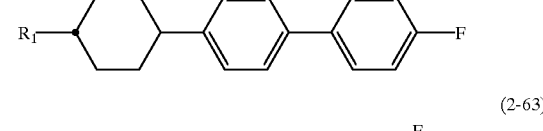
(2-63)
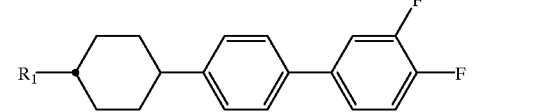
(2-64)
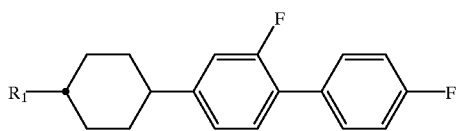
(2-65)
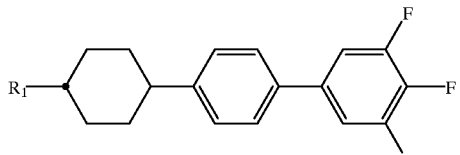
(2-66)
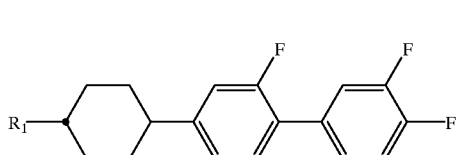
(2-67)
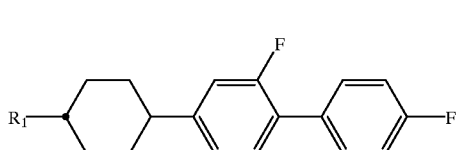
(2-68)
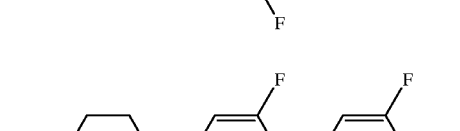
(2-69)
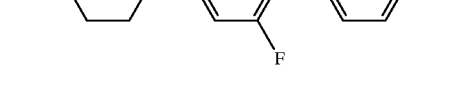
(2-70)
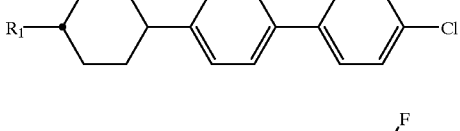
(2-71)
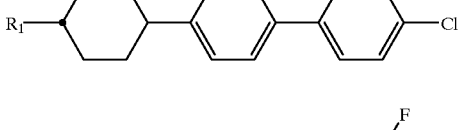
(2-72)
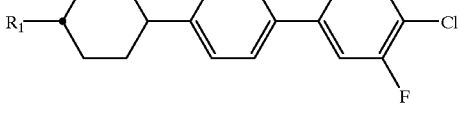
(2-73)
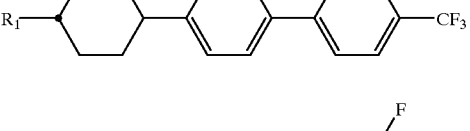

(2-74)
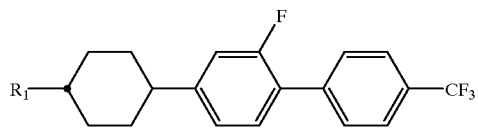
(2-75)
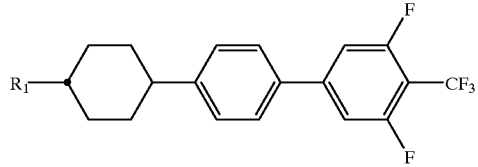
(2-76)
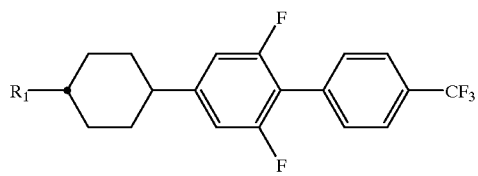
(2-77)
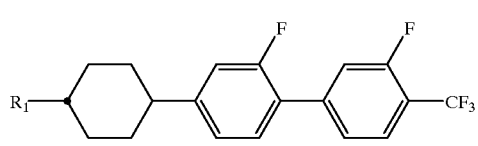
(2-78)
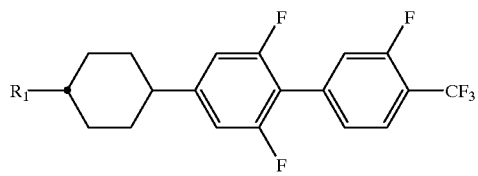
(2-79)
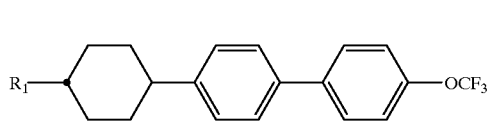
(2-80)
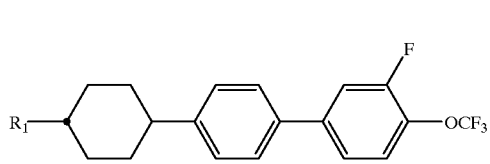
(2-81)
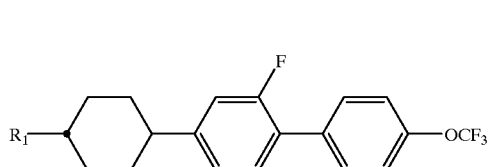
(2-82)
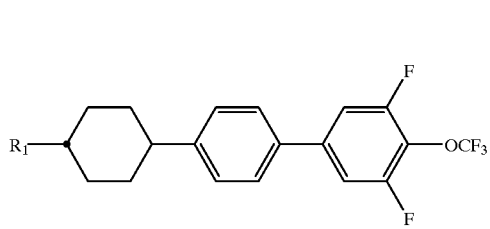
(2-83)
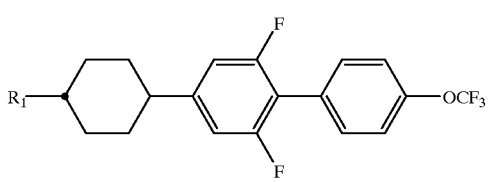
(2-84)
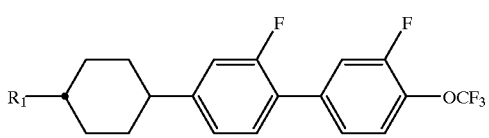
(2-85)
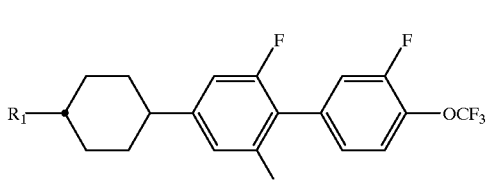
(2-86)
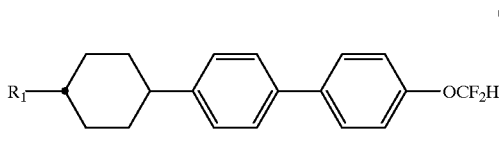
(2-87)
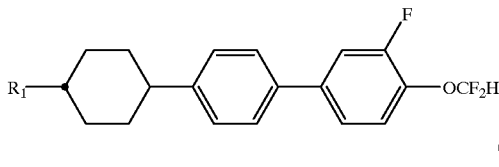
(2-88)
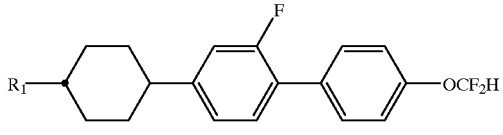
(2-89)
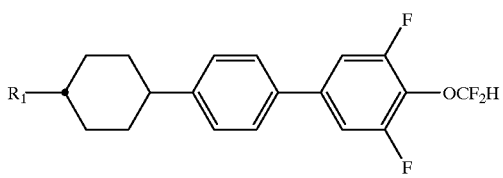
(2-90)
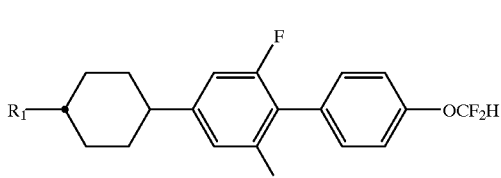
(2-91)
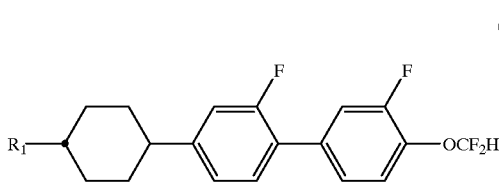

-continued (2-92)
(2-93)
(2-94)
(2-95)
(2-96)
(2-97)
(2-98)
(2-99)

-continued (2-100)
(2-101)
(2-102)
(2-103)
(2-104)
(2-105)
(2-106)
(2-107)
(2-108)

(2-109)
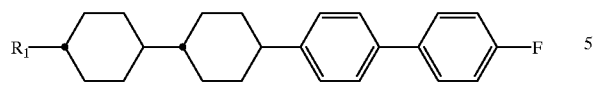
(2-110)
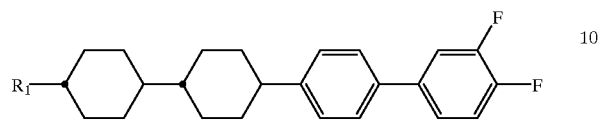
(2-111)
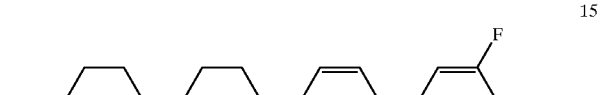
(2-112)
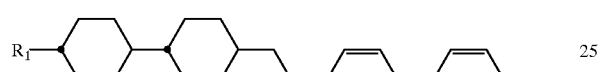
(2-113)
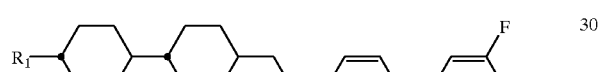
(2-114)
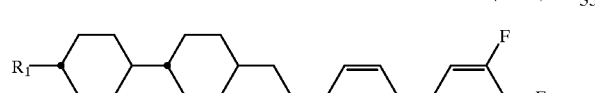
(2-115)
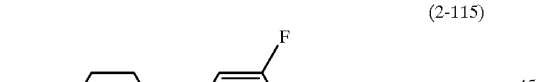
(2-116)
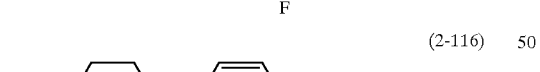
(2-117)
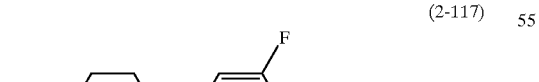
(2-118)
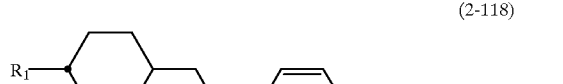
(2-119)
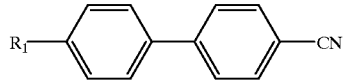
(2-120)
(2-121)
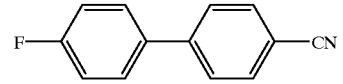
(2-122)
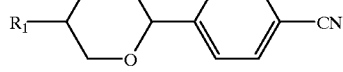
(2-123)
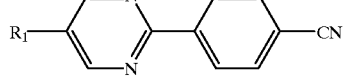
(2-124)
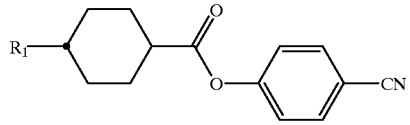
(2-125)
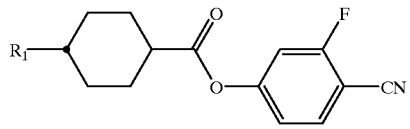
(2-126)
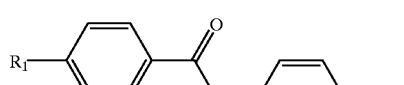
(2-127)
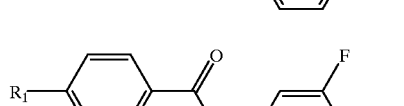
(2-128)
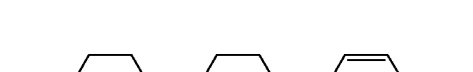
(2-129)
(2-130)
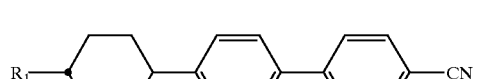

(2-131) 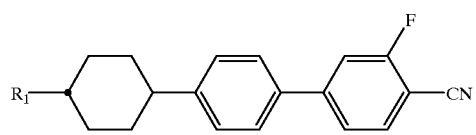
(2-132) 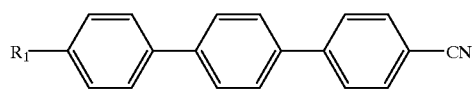
(2-133) 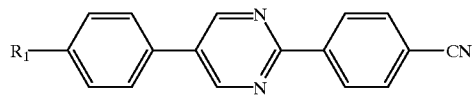
(2-134) 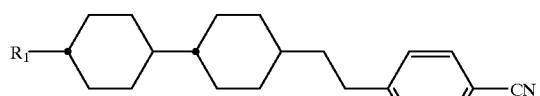
(2-135) 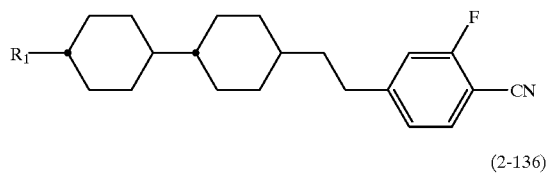
(2-136) 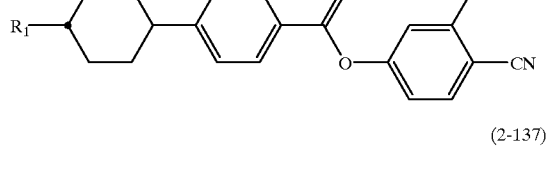
(2-137) 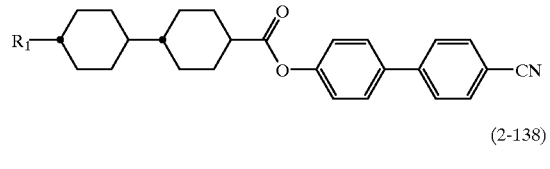
(2-138) 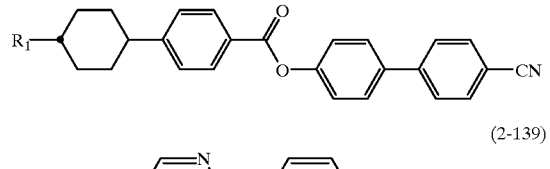
(2-139) 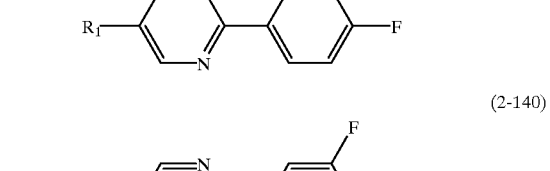
(2-140) 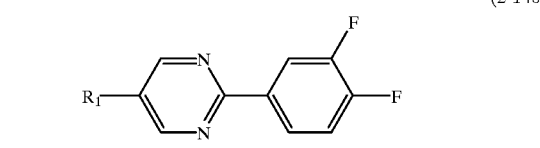
(2-141) 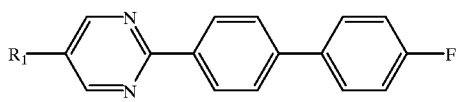
(2-142) 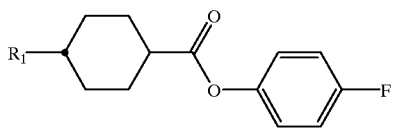
(2-143) 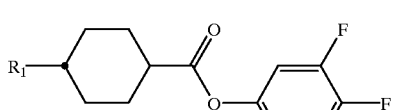
(2-144) 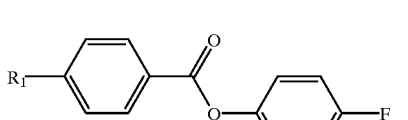
(2-145) 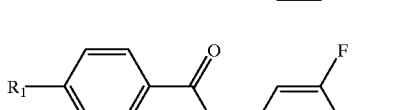
(2-146) 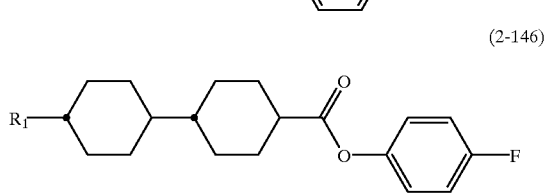
(2-147) 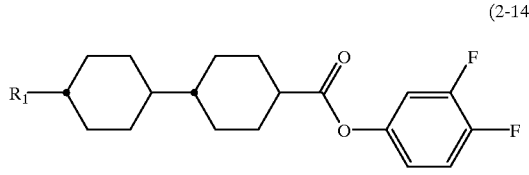
(2-148) 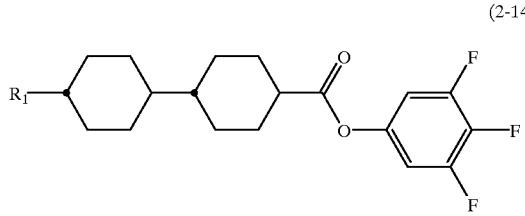
(2-149) 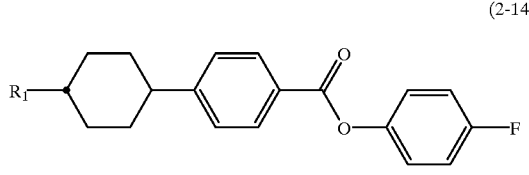
(2-150) 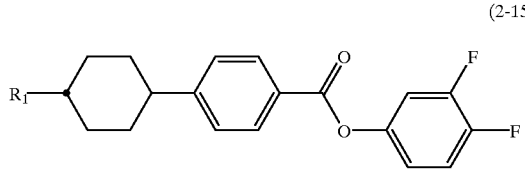

(2-151)
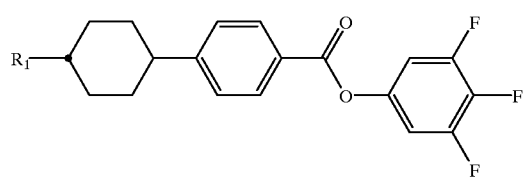
(2-152)
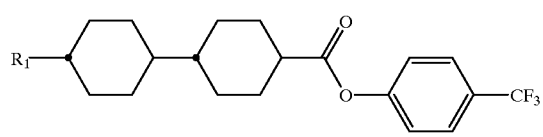
(2-153)
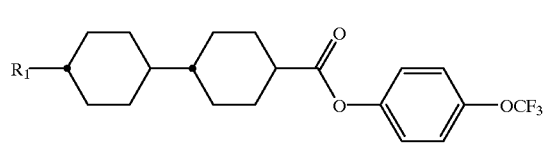
(2-154)
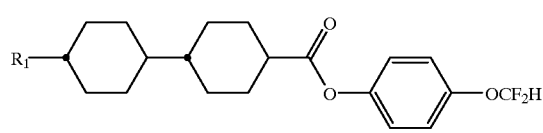
(2-155)
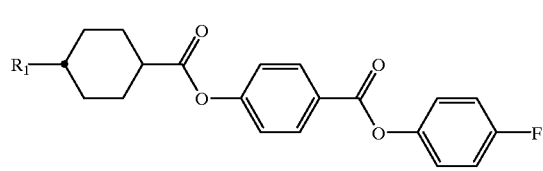
(2-156)
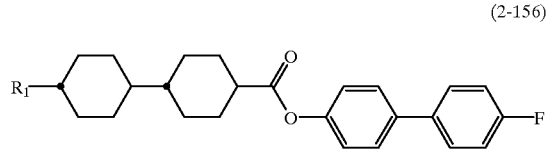
(2-157)
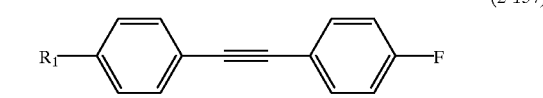
(2-158)
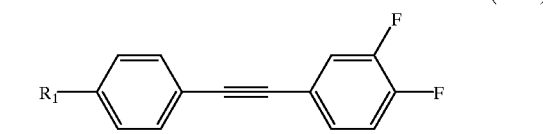
(2-159)
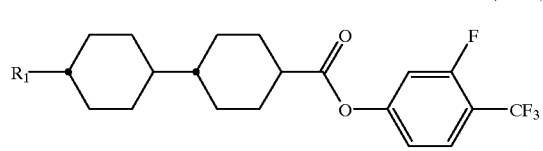
(2-160)
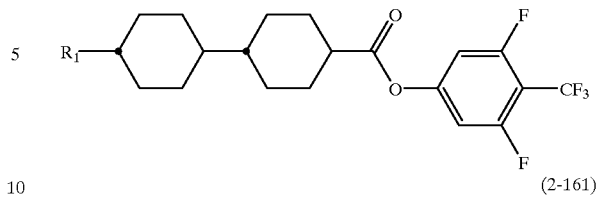
(2-161)
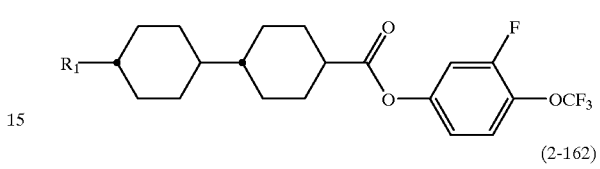
(2-162)
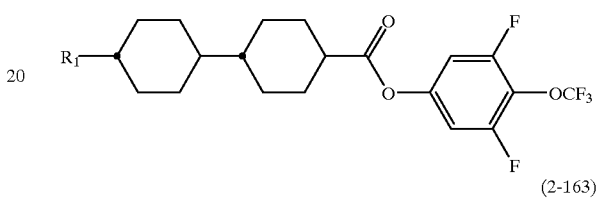
(2-163)
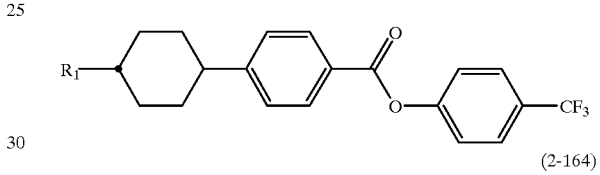
(2-164)
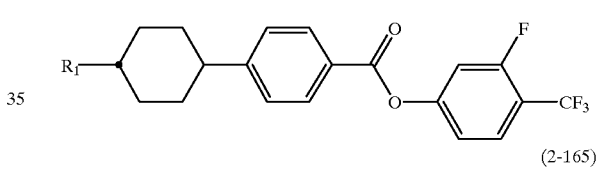
(2-165)
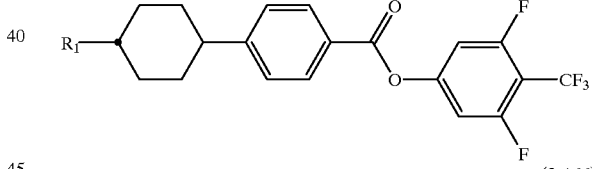
(2-166)
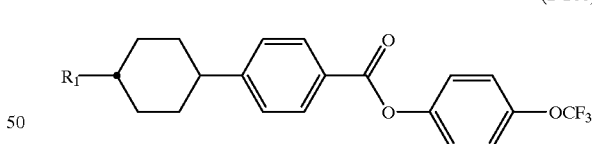
(2-167)
(2-168)
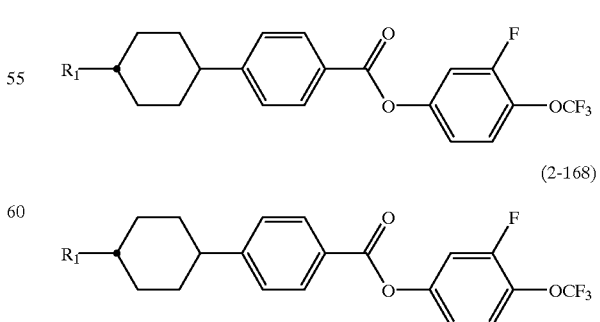

-continued
(2-169) 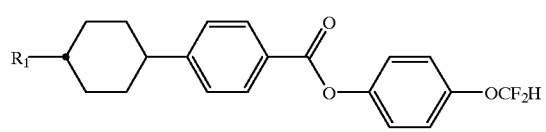
(2-170) 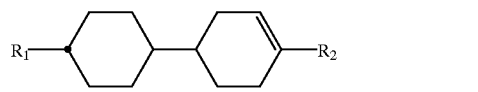
(2-171) 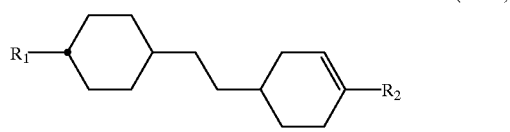
(2-172) 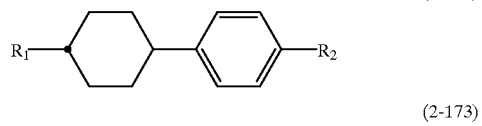
(2-173) 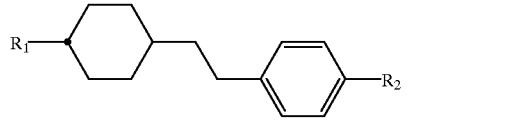
(2-174) 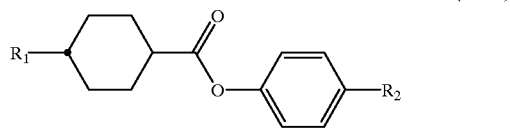
(2-175) 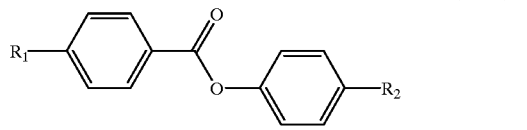
(2-176) 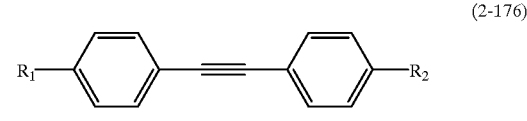
(2-177) 
(2-178) 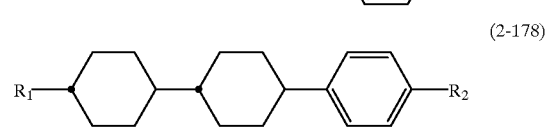
(2-179) 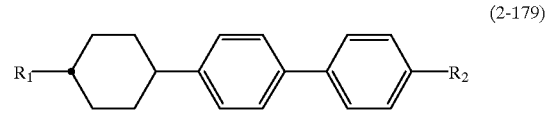
(2-180) 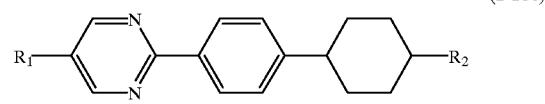
-continued
(2-181) 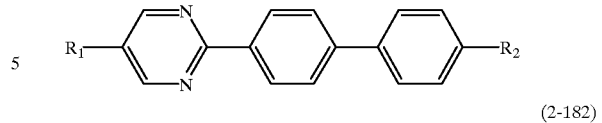
(2-182) 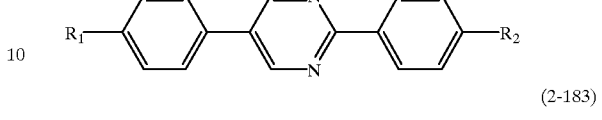
(2-183) 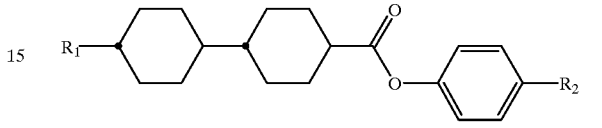
(2-184) 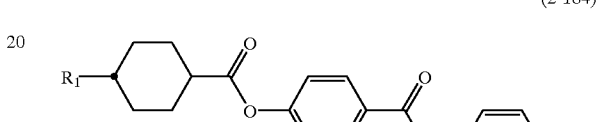
(2-185) 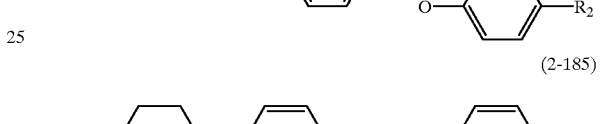
(2-186) 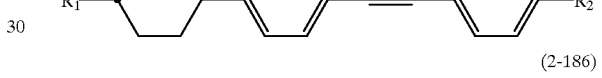
(2-187) 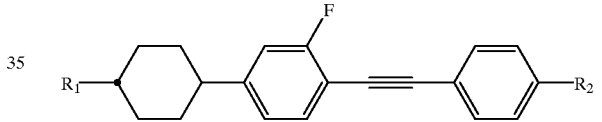
(2-188) 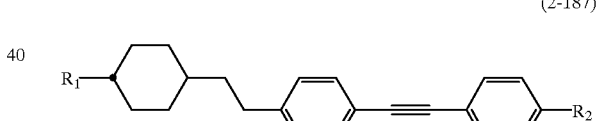
(2-189) 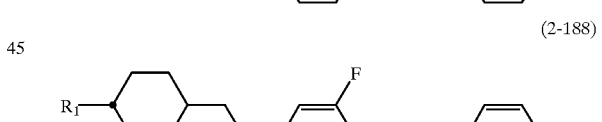
(2-190) 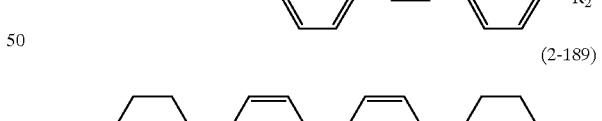
(wherein R1, R2=alkyl, alkyloxy, alkenyl, alkynyl and other groups typical for liquid crystals)
Though any sort of nematic liquid crystals can be applied for this invention, preferably the liquid crystal basic mix tures should not have optical absorption bands in the region of the irradiation light switching between the two states. Because switching preferably is done with ultraviolet light, specially non-aromatic liquid crystal materials are useful, preferably compounds of the following general formulas (2-191)–(2-227).
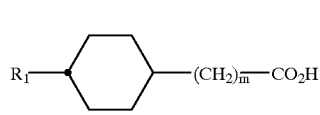
(2-191)
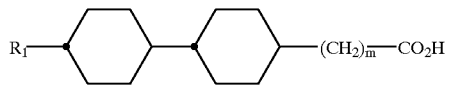
(2-192)
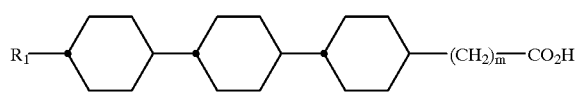
(2-193)
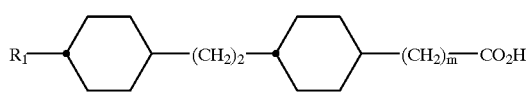
(2-194)
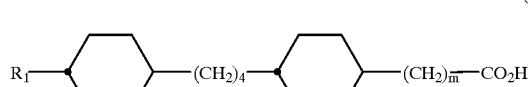
(2-195)
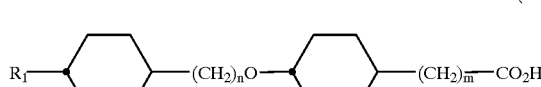
(2-196)
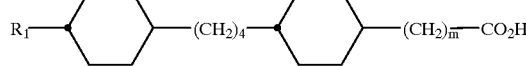
(2-197)
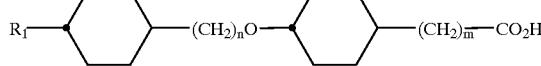
(2-198)
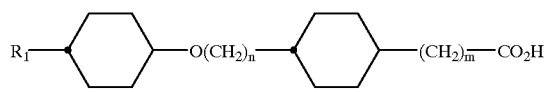
(2-199)
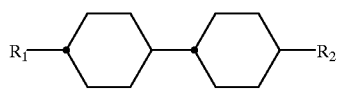
(2-200)
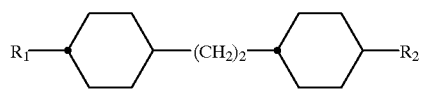
(2-201)
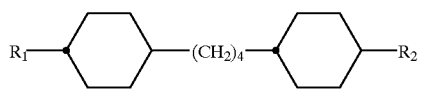
(2-202)
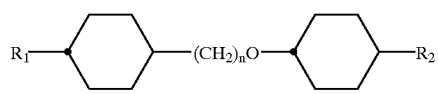
(2-203)
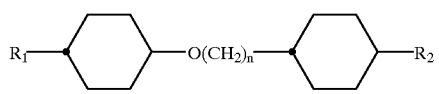
(2-204)
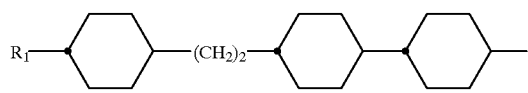
(2-205)
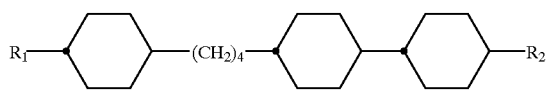
(2-206)
(2-207)
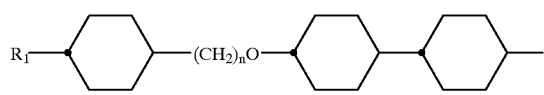
(2-208)
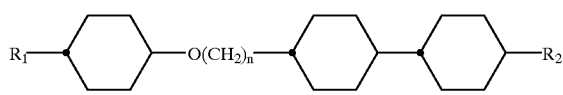
(2-209)
(2-210)
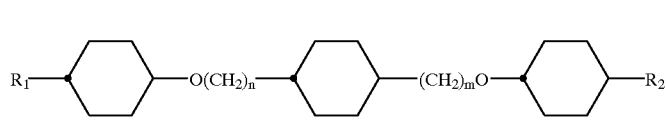

-continued

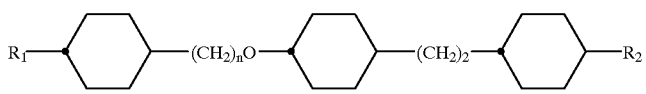 (2-211)

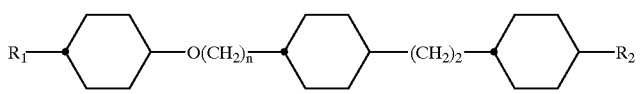 (2-212)

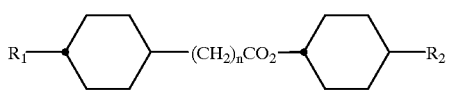 (2-213)
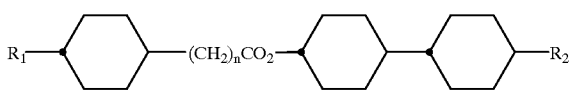 (2-214)

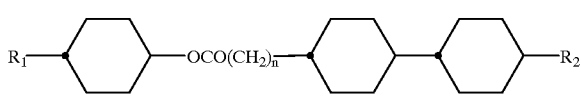 (2-215)

 (2-216)

 (2-217)

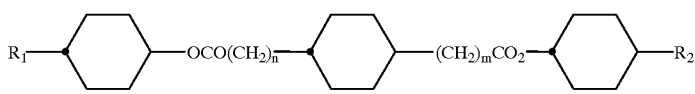 (2-218)

 (2-219)
 (2-220)

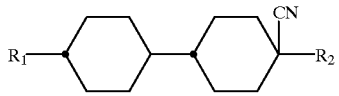 (2-221)
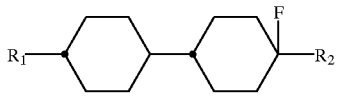 (2-222)

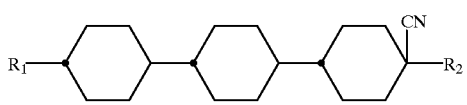 (2-223)
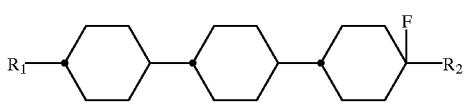 (2-224)

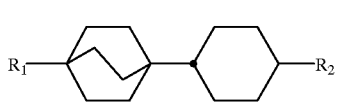 (2-225)
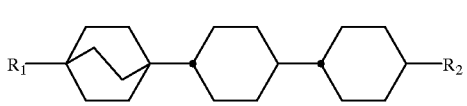 (2-226)

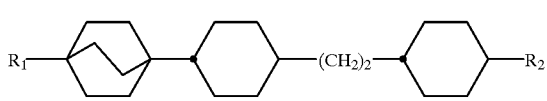 (2-227)

(wherein R1, R2=alkyl, alkyloxy, halogene, cyano and other groups typical for liquid crystals, m, n=independently 0–10)

Liquid crystals of these general formulas are already known and have been described in the literature. Compounds of such type do not show optical absorption in the near UV region.

As a basic mixture, nematic discotic materials (discotic materials are listed in LiqCryst, Database of Liquid Crystalline Compounds for personal Computers, by V. Vill, Hamburg 1995) can be used. Because nematic discotic compounds usually have relatively high clearing temperatures, multicomponent mixtures are necessary. Discotic nematic materials are specially compatible with the sterically overcrowded chiral olefins.

The following compounds (3-1)–(3-11) are suitable discotic materials for this invention.

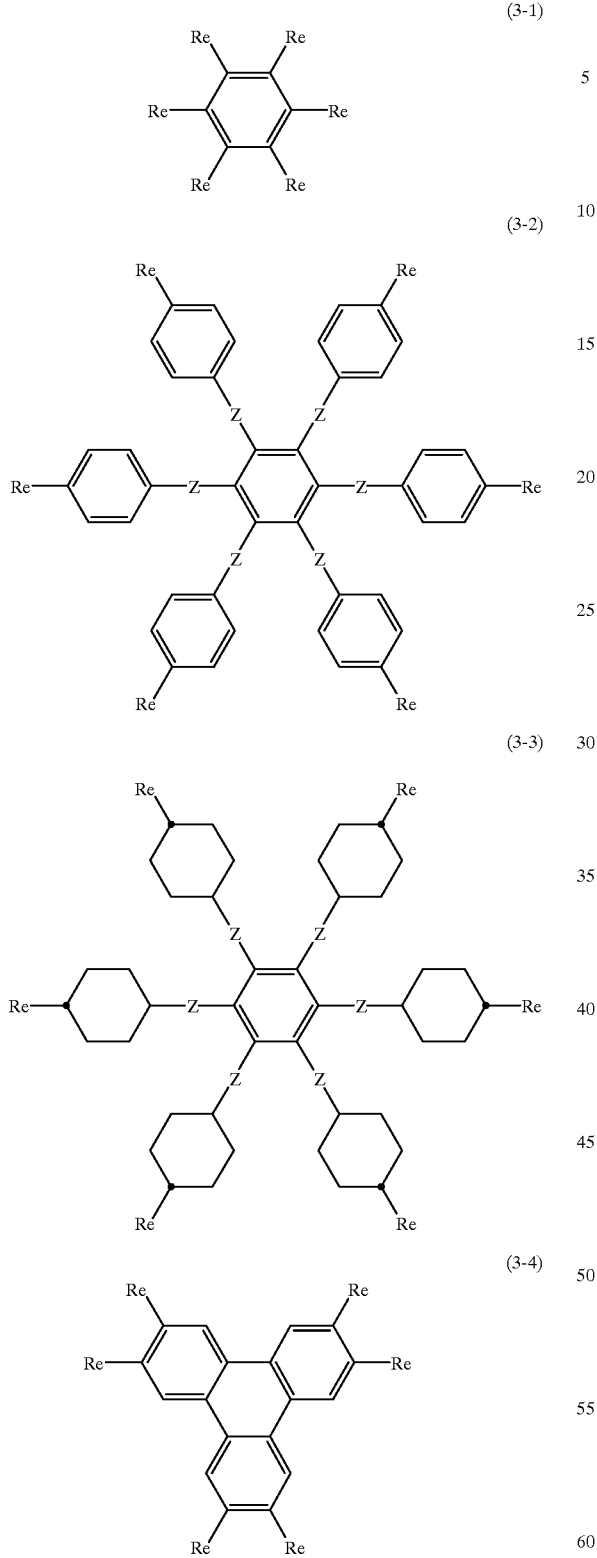
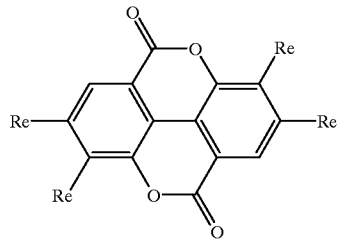
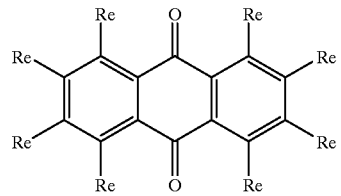
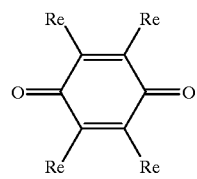
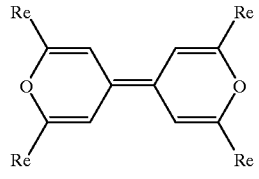
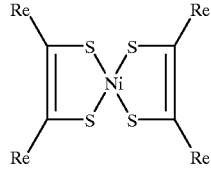
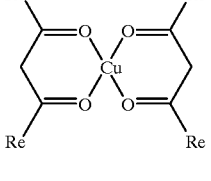
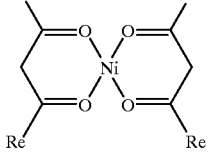
(wherein Re=represents alkyl chain or halogen atoms in which one or two methylene moiety can be replaced by O, C=O, S, CH=CH, C≡C, and one or two hydrogens can be replaced by CN or halogen atoms. Z represents OCO, $CH_2CH_2$, C≡C, $CH_2O$, $OCH_2$, $CH_2S$, $SCH_2$, NHCO, $OCOCH_2$, OCOCH=CH, $CH_2OCO$, N=N).

BEST MODE FOR CARRYING OUT THE INVENTION

Figure 1:
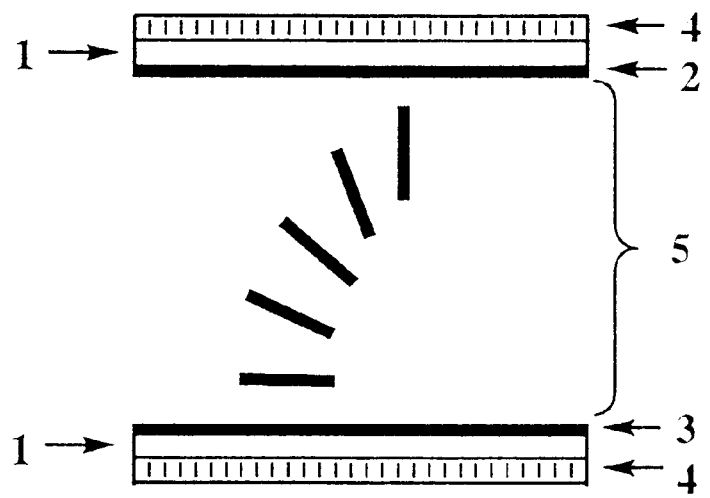
FIG. 1 shows a director orientation of the liquid crystals in the hybrid cell.

EXAMPLE 1
Preparation of a Chirooptic Device Using a Hybrid Cell and a Liquid Crystalline Mixture A cholesteric mixture comprising of 99.9 wt % of a nematic mixture (65 mol % 4-butylcyclohexanecarboxylic acid+35 mol % of 4-hexylcyclohexanecarboxylic acid, clearing temperature=91° C., αn=0.02) showing nematic phase at room temperature and 0.1 wt % of a chiral compound represented by the formula (1-1), wherein Ra=hydrogen, Rb=dimethylamino, Rc=nitro, X1=X2=sulfur, was prepared. The cholesteric mixture was put into a hybrid in which the liquid crystals were aligned parallel along one glass and perpendiculer to another glass, as shown in FIG. 1. By adjusting two polarizers in a suitable mutual angle a chirooptical cell showing dark state was obtained. Two stable repeatable states, dark and bright states, were obtained by irradiation of light having two different wavelengths (435 nm/dark state, 365 nm/bright state) as shown in scheme 1.

EXAMPLE 2
Preparation of Holographic Recording System

Figure 2:
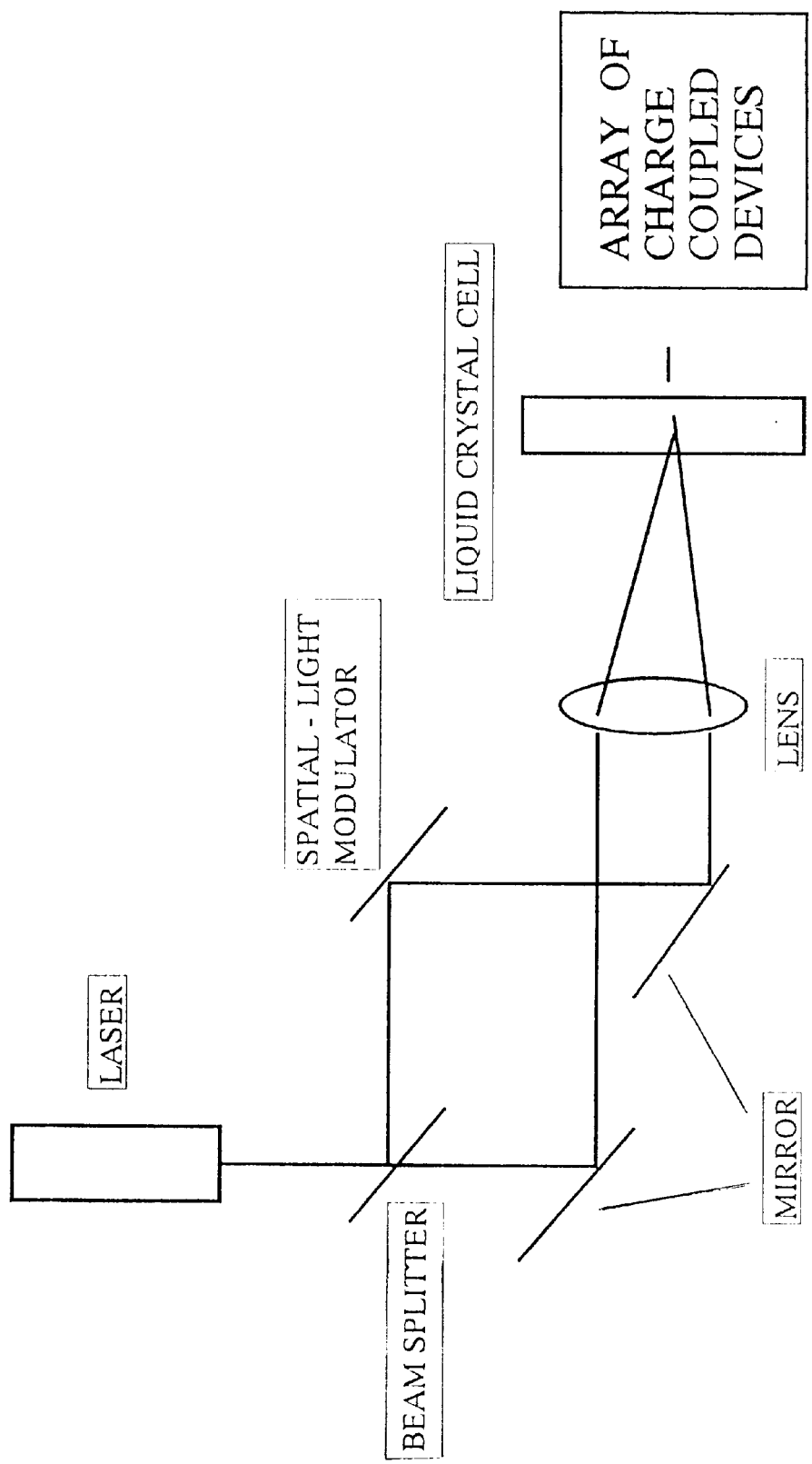
FIG. 2 shows illustration of a holographic arrangement using the devices of the invention.

Holographic arrangement, as shown in FIG. 2, was settled. Wherein BS represents a beam splitter and the liquid crystal cell was filled with the cholesteric mixture obtained in Example 1. A laser beam with wavelength 435 nm was split into two beams, one of which was modulated by the modulator. Within the liquid crystal device, the two beams interfered to give the hologram containing the information. By irradiation with light of the wavelength 365 nm, the information could be erased.

EXAMPLE 3
Preparation of a Chirooptic Device Using a Hybrid Cell and a Liquid Crystalline Mixture Containing Azo Compound The mixture of 65 mol % 4-butylcyclohexane-carboxylic acid+35 mol % of 4-hexylcyclohexanecarboxylic acid was nematic with a clearing temperature of 91° C. The mixture did not absorb light in visible or near UV spectral region. To this mixture 1 mol % of (S)-4-ethoxy-4'-(2-methylbutyl) azobenzene was added to give a cholesteric material. The mixture was put into a hybrid cell in which the liquid crystals were aligned parallel along one glass and perpendicular to another glass, as shown in FIG. 1. By irradiation with light of the wavelength 350 nm the cis isomer of the azo compound was formed. By irradiation with light of the wavelength region between 400 and 500 nm the trans isomer was formed. By alternative irradiation with light of one of these preferred regions information could be inscribed and vanished.

EXAMPLE 4
Preparation of Holographic Recording System Using a Mixture Containing Azo-compound Holographic arrangement, as described in Example 2, was settled. The liquid crystal cell was filled with the mixture prepared in Example 3. A laser beam with wavelength 350 nm was split into two beams, one of which was modulated by the modulator. Within the liquid crystal device, the two beams interfered to give the hologram containing the information. By irradion with light of the wavelength region between 400–500 nm, the information could be erased.

EXAMPLE 5
Preparation of a Chirooptic Device Using a Hybrid Cell and a Discotic Liquid Crystalline Mixture A nematic discotic mixture comprising of 2,3,4,5,6-pentakis(2-(4-pentylphenyl)ethynyl)-1-(11-hydroxyundecyloxy)benzene 45 mol % 2,3,4,5,6-pentakis(2-(4-pentylphenyl)ethynyl)-1-(10-ethoxycarbonyldecyloxy) benzene 40 mol % and 2,3,4,5,6-

Scheme 1

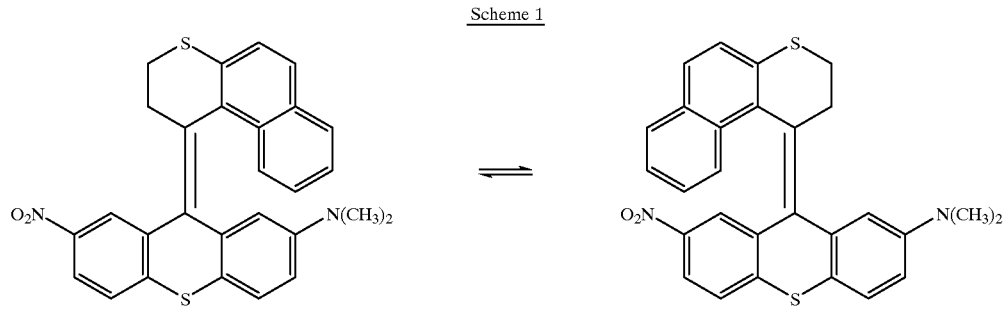

pentakis(2-(4-pentylphenyl)ethynyl)-1-(10-hydroxycarbonyldecyloxy)benzene 15 mol %, was prepared. The compounds were synthesized according to the literature, D. Janietz, K. Praefcke and D. Singer, Liq. Cryst., 13 (2), 247 (1993). A nematic discotic mixture comprising of 99.9 wt % of the prepared nematic discotic base mixture and 0.1 wt % of a chiral compound represented by the formula I, wherein Ra=hydrogen, Rb=dimethylamino, Rc=nitro, X1=X2=sulfur, was prepared. The nematic discotic mixture was put into a hybrid in which the liquid crystals are aligned parallel along one glass and perpendicular to another glass, as shown in FIG. 1. By adjusting two polarizers in a suitable mutual angle a chirooptical cell showing dark state was obtained. Two stable repeatable states, dark and bright states, were obtained by irradiation of light having two different wavelengths.

EXAMPLE 6

Preparation of Holographic Recording System Using a Nematic Discotic Mixture

Holographic arrangement, as shown in FIG. 2, was settled. The liquid crystal cell was filled with the discotic mixture obtained in Example 5. A laser beam with wavelength 435 nm was split into two beams, one of which was modulated by the modulator. Within the liquid crystal device, the two beams interfered to give the hologram containing the information. By irradiation with light of the wavelength 365 nm, the information could be erased.

What is claimed is:

1. A device useful for storage of information, characterized by that the device contains a mixture of suitable chiral materials with nematic liquid crystals, wherein the mixture is between two plates and the director of the mixture is oriented parallel at the one plate and normal at the other plate, and further characterized by that by irradiation with light of two different wavelengths, the chirality of the mixture can be reversibly switched between two stable states of different chirality, corresponding to two states of different optical properties.

2. The device of claim 1, wherein the device is placed between two polarizers and the mixture is between two plane glass or plastic plates.

3. The device of claim 1, characterized by its use as holographic storage medium.

4. The device of claim 1, wherein the nematic liquid crystals consist of non-aromatic calamitic (rod-like) molecules.

5. The device of claim 1, wherein the nematic liquid crystals consist of nematic discotic molecules.

6. The device of claim 1, wherein the chiral material consists of sterically overcrowded olefins.

7. The device of claim 1, wherein the chiral materials consist of chiral azo compounds.

8. A method of storing information comprising: irradiating light on the device of claim 1 to store information.

9. A method of storing information comprising:

Irradiating light of a first wave-length on a mixture of suitable chiral materials with nematic liquid crystals contained between two plates wherein the liquid crystals are aligned parallel to one plate and perpendicular to the other plate;

storing information corresponding to the first radiated light.

10. The method according to claim 9, further comprising irradiating light of a second wave-length, different from the first wave-length, on the mixture to erase the stored information.

* * * * *